United States Patent
Murata

[11] Patent Number: 6,163,678
[45] Date of Patent: Dec. 19, 2000

[54] SATELLITE PACKET TERMINAL AND METHOD FOR TRANSMITTING PACKET DATA FROM THE SAME

[75] Inventor: Makoto Murata, Tokyo, Japan

[73] Assignee: Mitsubishi Denki Kabushiki Kaisha, Tokyo, Japan

[21] Appl. No.: 09/084,388

[22] Filed: May 27, 1998

[30] Foreign Application Priority Data

Jan. 13, 1998 [JP] Japan .................................. 10-005087

[51] Int. Cl.[7] .................................................. H04B 7/204
[52] U.S. Cl. ........................ 455/12.1; 455/427; 455/67.3; 455/18; 455/504; 455/91; 370/428; 370/216; 370/316
[58] Field of Search .................................. 455/12.1, 13.1, 455/13.2, 24, 18, 427, 430, 504, 505, 67.1, 3, 69, 91, 92; 370/428, 216, 316

[56] References Cited

U.S. PATENT DOCUMENTS 5,664,104  9/1997  Shinjo et al. ..................... 370/216 X
5,867,769  2/1999  Ichiyanagi ........................... 455/69
5,953,649  9/1999  Junell ............................. 455/13.1 X

FOREIGN PATENT DOCUMENTS 59-212040  11/1984  Japan .

*Primary Examiner*—Fan Tsang
*Assistant Examiner*—Philip J. Sobutka
*Attorney, Agent, or Firm*—Rothwell, Figg, Ernst & Manbeck

[57] ABSTRACT

To carry out smooth data communication even when a radio communication channel with a satellite is in a fault state, it is judged whether the radio communication channel is in a fault state or not, and packet data transmitted from a data terminal are stored in a prebuffer and are not transmitted to the satellite when it is judged that the radio communication channel is in a fault state, and are transmitted from the prebuffer to the satellite sequentially when it is judged that the radio communication channel is recovered from the fault state.

8 Claims, 4 Drawing Sheets

SATELLITE PACKET TERMINAL AND METHOD FOR TRANSMITTING PACKET DATA FROM THE SAME

BACKGROUND OF THE INVENTION

1. Field of the Invention

This invention relates to a satellite packet terminal for the communication of packet data through a communication satellite and to a method for transmitting packet data from the same in satellite communication.

2. Description of the Prior Art

Figure 4:
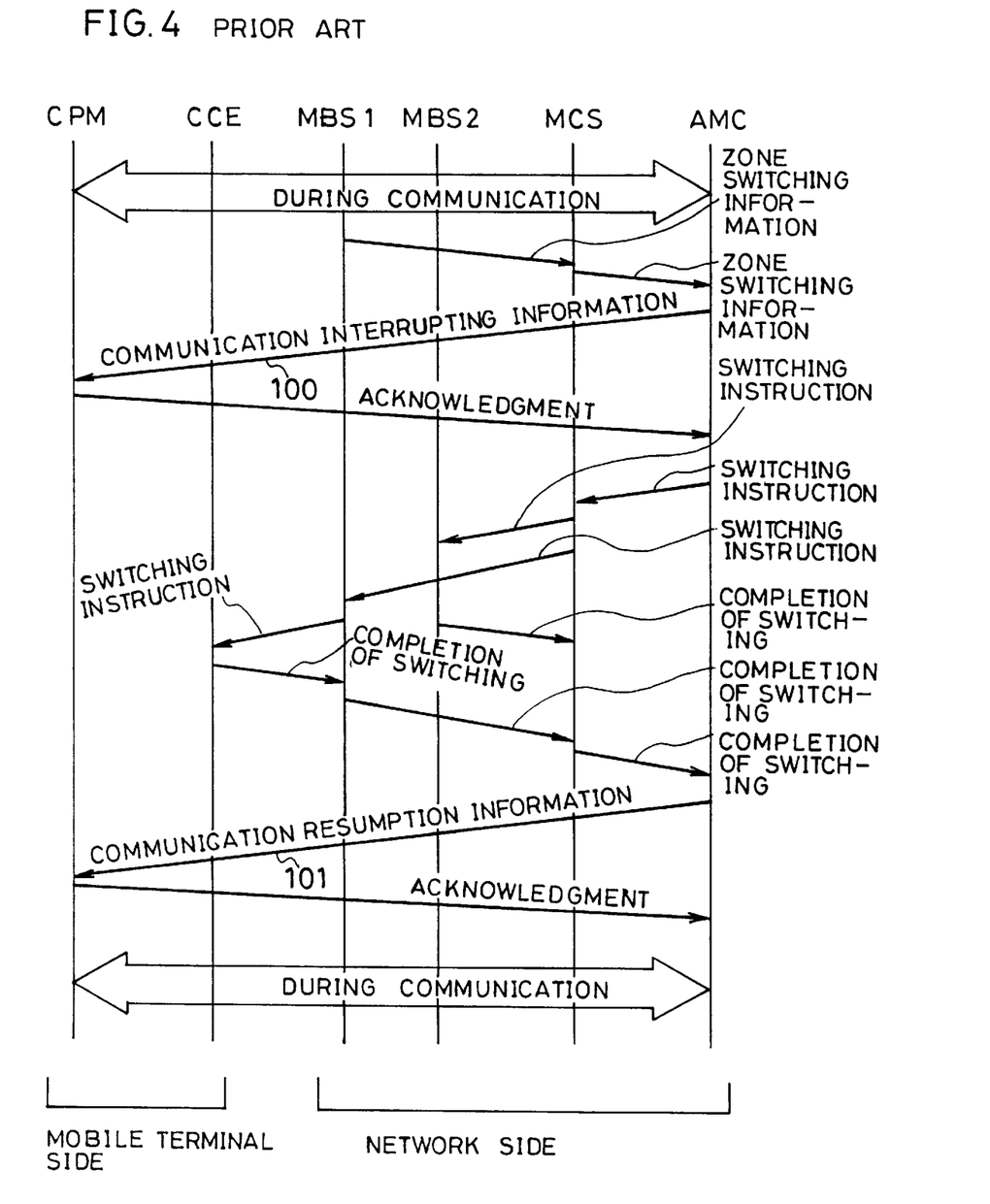
FIG. 4 shows the sequence of a signal flow between a mobile terminal and a network in a conventional mobile radio communication system.

In mobile radio communication, the radio zone may be changed along with the movement of a mobile station. When the above communication means is a telephone such as a car telephone or ship telephone, even if the zone switching time is about 1 second, a hit or interruption in communication caused by zone switching does not present a big problem. However, in the case of data communication, missing data caused by a hit at the time of zone switching are fatal. To cope with this problem, in a conventional mobile radio communication system disclosed in Japanese Laid-open Patent Application No. Sho 59-212040, transmission data are temporarily stored in a buffer when the zone is changed and transmitted after the end of a hit. FIG. 4 shows the sequence of a signal flow between a mobile terminal and a network in the above conventional mobile radio communication system. When a zone switch signal is transmitted from a base station 1 (MBS1) to a mobile exchange (AMC) before the processing of zone switching, AMC gives a communication interruption signal 100 to the data processor (CPM) of the mobile terminal. After zone switching from the base station 1 (MBS1) to a base station 2 (MBS2) is completed, the above mobile terminal falls into a hit where it cannot communicate with the base stations (1, 2) until a communication start signal 101 is given from the AMC to the CPM of the above mobile terminal. Then, the above mobile terminal stores data generated from its built-in data terminal in its built-in buffer, takes out the stored data when it receives the communication start signal 101 from the AMC and resumes data transmission.

However, the zone switching system of the mobile communication system which has the above zone system and controls zone switching under the directions of base stations could not be used in satellite communication which has no zone system. For example, when there are buildings, tunnels and trees which interrupt communication between a satellite and a mobile station, communication between a mobile satellite packet terminal and a satellite base station becomes impossible. Even if the satellite packet terminal is not a mobile station but a fixed station, communication with a satellite base station may become impossible due to temporary jamming caused by an airplane or the like. That is, such communication trouble cannot be detected by the satellite base station and reported to the satellite packet terminal. Therefore, when satellite communication between the satellite packet terminal and the satellite base station becomes impossible temporarily, confirmation information on the transmission of the packet data to the satellite is not provided to the data terminal of the satellite packet terminal, and the satellite packet terminal instructs the above data terminal to stop the transmission of the subsequent packet data in accordance with a packet communication protocol (Receive Not Ready). Therefore, smooth data communication is impossible.

It is an object of the present invention which has been made to solve the above problem to provide a satellite packet terminal which enables smooth data communication even when a radio communication channel with a satellite falls into a fault state and a method for transmitting packet data from the same.

According to a first aspect of the present invention, there is provided a method for transmitting packet data from a satellite packet terminal, which comprises the steps of judging whether a radio communication channel is in a fault state or not based on the reception state of a reception signal received from a satellite through the radio communication channel, storing packet data to be transmitted to the satellite in storage means when it is judged that the radio communication channel is in a fault state, and transmitting the packet data stored in the storage means to the satellite sequentially when it is judged that the radio communication channel is recovered from the fault state.

According to a second aspect of the present invention, there is provided a method for transmitting packet data from a satellite packet terminal, which comprises the steps of judging whether a radio communication channel will fall into a fault state based on the change rate of the reception state of a reception signal received from a satellite through the radio communication channel, storing packet data to be transmitted to the satellite in storage means when it is judged that the radio communication channel will fall into a fault state, and transmitting the packet data stored in the storage means to the satellite sequentially when it is judged that the radio communication channel is recovered from the fault state.

According to a third aspect of the present invention, there is provided a satellite packet terminal which comprises a satellite circuit monitoring unit for measuring the reception level of a reception signal received from a satellite through a radio communication channel, a judging unit for judging whether the radio communication channel is in a fault state or not based on the measured reception level, and a prebuffer for storing packet data transmitted from a data terminal, wherein the packet data transmitted from the data terminal housed in the satellite packet terminal are stored in the prebuffer when it is judged that the radio communication channel is in a fault state and transmitted from the prebuffer to the satellite sequentially when it is judged that the radio communication channel is recovered from the fault state.

According to a fourth aspect of the present invention, there is provided a satellite packet terminal, wherein the satellite circuit monitoring unit calculates the change rate of the reception level of the reception signal, the judging unit judges whether the radio communication channel will fall into a fault state based on the change rate of the reception level, and the packet data transmitted from the data terminal are stored in the prebuffer when it is judged that the radio communication channel will fall into a fault state and transmitted from the prebuffer to the satellite sequentially when it is judged that the radio communication channel is recovered from the fault state.

According to a fifth aspect of the present invention, there is provided a satellite packet terminal which comprises a satellite circuit monitoring unit for detecting whether a reception signal received from a satellite through a radio communication channel is synchronized or not, a judging unit for judging whether the radio communication channel is in a fault state or not based on the synchronism of the reception signal, and a prebuffer for storing packet data transmitted from a data terminal, wherein the packet data transmitted from the data terminal housed in the satellite packet terminal are stored in the prebuffer when it is judged that the radio communication channel is in a fault state and transmitted from the prebuffer to the satellite sequentially when it is judged that the radio communication channel is recovered from the fault state.

According to a sixth aspect of the present invention, there is provided a satellite packet terminal, wherein the satellite circuit monitoring unit calculates the frequency of the asynchronism of the reception signal, the judging unit judges whether the radio communication channel will fall into a fault state based on the frequency of the asynchronism of the reception signal, and the packet data transmitted from the data terminal are stored in the prebuffer when it is judged that the radio communication channel will fall into a fault state and transmitted from prebuffer to the satellite sequentially when it is judged that the radio communication channel is recovered from the fault state.

According to a seventh aspect of the present invention, there is provided a satellite packet terminal which comprises a satellite circuit monitoring unit for measuring the C/N ratio of a reception signal received from a satellite through a radio communication channel, a judging unit for judging whether the radio communication channel is in a fault state or not based on the measured C/N ratio, and a prebuffer for storing packet data transmitted from a data terminal housed in the satellite packet terminal, wherein the packet data transmitted from the data terminal are stored in the prebuffer when it is judged that the radio communication channel is in a fault state and transmitted from the prebuffer to the satellite sequentially when it is judged that the radio communication channel is recovered from the fault state.

According to an eighth aspect of the present invention, there is provided a satellite packet terminal, wherein the satellite circuit monitoring unit calculates the change rate of the C/N ratio of the reception signal, the judging unit judges whether the radio communication channel will fall into a fault state based on the change rate of the C/N ratio, and the packet data transmitted from the data terminal are stored in the prebuffer when it is judged that the radio communication channel will fall into a fault state and transmitted from the prebuffer to the satellite sequentially when it is judged that the radio communication channel is recovered from the fault state.

The above and other objectives, features and advantages of the invention will become more apparent from the following description when taken in conjunction with the accompanying drawings.

DETAILED DESCRIPTION OF THE PREFERRED EMBODIMENTS

Preferred embodiments of the present invention will be described hereinunder with reference to the accompanying drawings.

Embodiment 1

Figure 1:
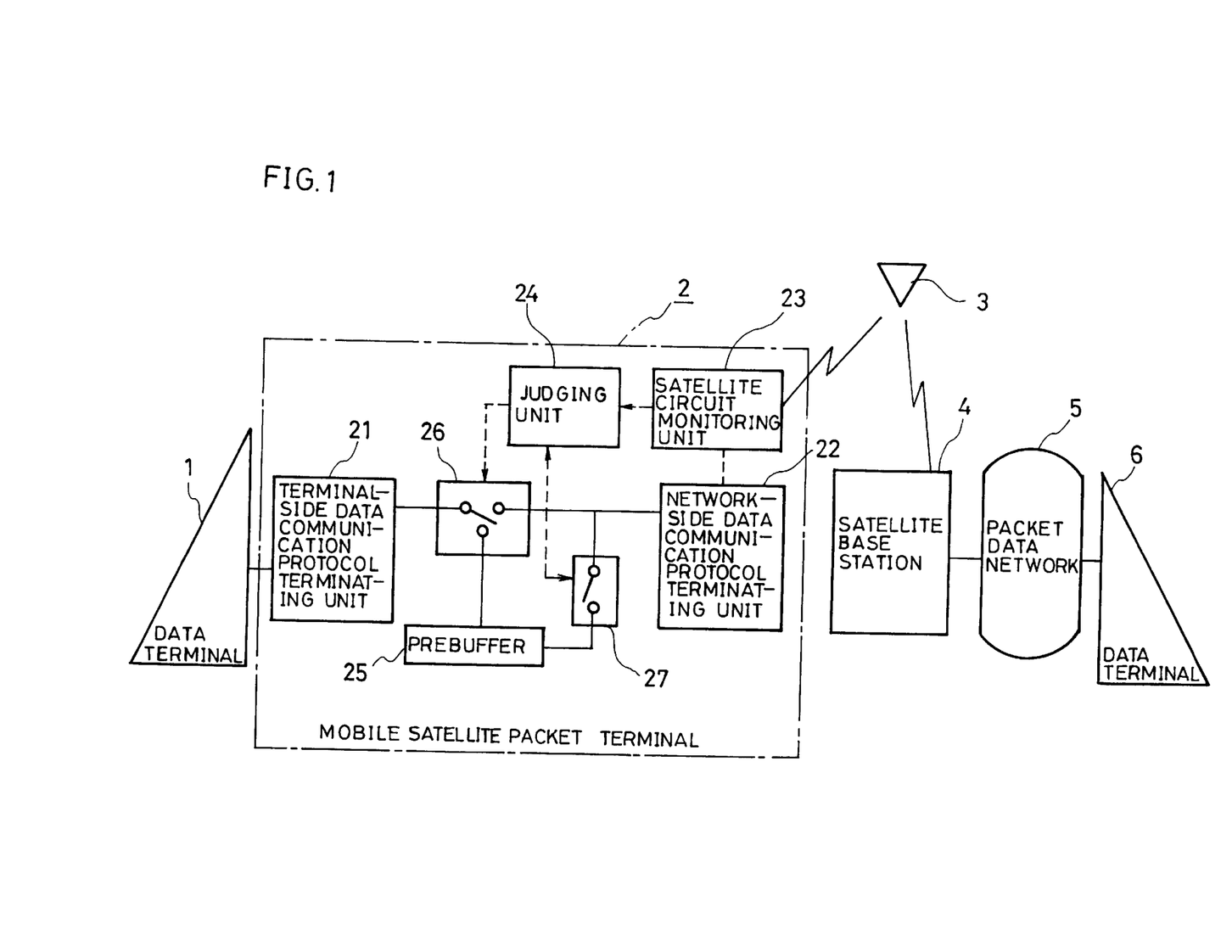
FIG. 1 is a diagram showing the configuration of a mobile satellite communication packet terminal and the configuration of a satellite communication network according to Embodiment 1 of the present invention.

FIG. 1 shows the configuration of a mobile satellite packet terminal and the configuration of a satellite communication network according to Embodiment 1 of the present invention. Reference numeral 1 denotes a data terminal for producing packet data to be transmitted to a satellite, 2 a mobile satellite packet terminal for the communication of the above packet data, 3 a communication satellite, 4 a satellite base station, 5 a packet data network, and 6 a data terminal of another party. Since the above data terminal 1 transmits packet data through the mobile satellite packet terminal 2, the data terminal 1 is called data terminal housed in the mobile satellite packet terminal 2.

The mobile satellite packet terminal 2 comprises a terminal-side communication protocol terminating unit 21 for terminating a protocol for data communication with the data terminal 1, a network-side communication protocol terminating unit 22 for terminating a protocol for data communication with a network, a satellite circuit monitoring unit 23 for monitoring the state of a radio communication channel from the satellite, judging unit 24 for judging the state of the radio communication channel from the current satellite based on information collected by the satellite circuit monitoring unit 23, a prebuffer 25 for temporarily storing packet data from the data terminal 1 when there is a fault in the radio communication channel from the satellite, a switching unit 26 for selecting the storage of packet data processed by the terminal-side communication protocol terminating unit 21 in the prebuffer 25 or the direct transmission of the packet data to the network-side communication protocol terminating unit 22 in accordance with an instruction from the judging unit 24, and a prebuffer reading unit 27 for reading packet data when there are packet data stored in the prebuffer 25 after the recovery of the radio communication channel from the satellite and sending it to the network-side communication protocol terminating unit 22.

Figure 2:
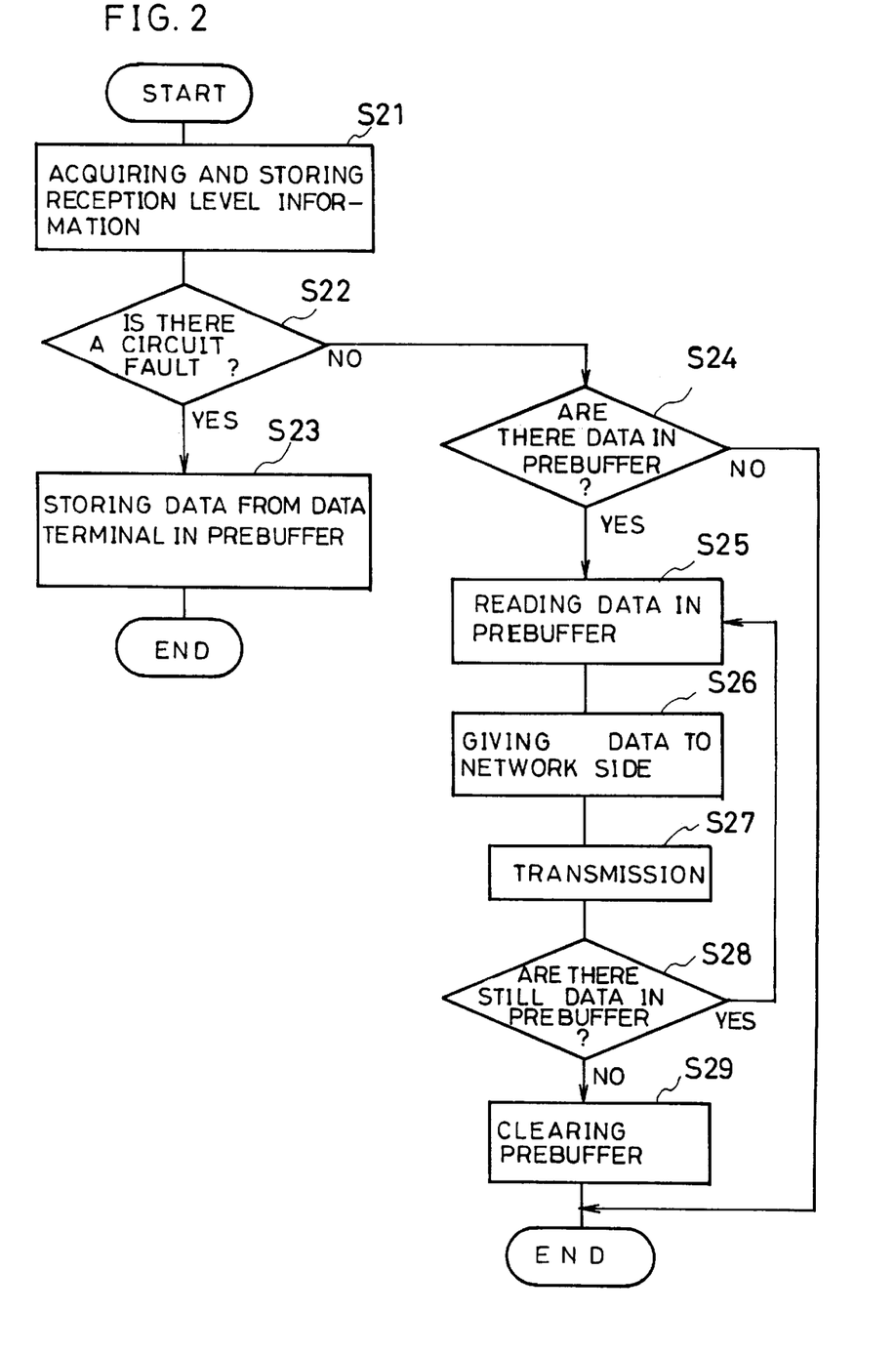
FIG. 2 is a flow chart for judging a circuit state according to Embodiment 1 of the present invention.

A description is subsequently given of the case where the data terminal 1 and the data terminal 6 communicate with each other through the mobile satellite packet terminal 2, the satellite 3, the satellite base station 4 and the packet data network 5. The satellite circuit monitoring unit 23 of the mobile satellite packet terminal 2 measures the reception level of the radio communication channel from the satellite and gives information on the measured reception level to the judging unit 24. FIG. 2 is a flow chart for judging the circuit state by means of the above judging unit 24. The judging unit 24 acquires and stores the above information on the reception level (step S21), checks the state of the radio communication channel from the satellite based on the above information on the reception level and judges whether the radio communication channel is in a fault state (step S22). When the judging unit 24 judges that the radio communication channel from the satellite 3 is in the fault state, it instructs the switching unit 26 to store packet data processed by the terminal-side communication protocol terminating unit 21 in the prebuffer 25 without giving it to the network-side communication protocol terminating unit 22 (step S23). At this point, the switching unit 26 gives a receive ready signal to the terminal-side communication protocol terminating unit 21 as it has confirmed the transmission of the packet data stored in the prebuffer 25. The terminal-side communication protocol terminating unit 21 which has received the signal transmits a receive ready packet (RR packet) to the data terminal 1 to urge the transmission of the next packet. Accordingly, the data terminal 1 can transmit the next packet to the mobile satellite packet terminal 2.

Meanwhile, when the judging unit 24 judges that the radio communication channel from the satellite 3 is not in a fault state in step S22, that is, the radio communication channel is normal or recovers from the fault state, it judges whether data are stored in the prebuffer 25 (step S24). When data are not stored in the prebuffer 25, the judging unit 24 instructs the switching unit 26 to deliver packet data processed by the terminal-side communication protocol terminating unit 21 to the network-side communication protocol terminating unit 22 and not to the prebuffer 25. When data are stored in the prebuffer 25, the judging unit 24 instructs the prebuffer reading unit 27 to read packet data stored in the prebuffer 25. Thus, the prebuffer reading unit 27 reads the packet data from the prebuffer 25 (step S25) and delivers them to the network-side communication protocol terminating unit 22 (step S26). The network-side communication protocol terminating unit 22 transmits the packet data to the radio communication channel for the satellite 3 (step S27). The judging unit 24 further judges whether data are still stored in the prebuffer 25 (step S28). When the stored packet data still remain in the prebuffer 25, the routine returns to the above step S25 to transmit the packet data to the radio communication channel in accordance with the above-described procedure. The prebuffer reading unit 27 reads all the packet data stored in the prebuffer 25, informs the network-side communication protocol terminating unit 22 to clear the prebuffer 25 (step S29), reports the judging unit 24 of the clearance of the prebuffer 25 and notifies the switching unit 26 through the judging unit 24 that all the packet data stored in the prebuffer 25 have been transmitted through the satellite circuit. The informed switching unit 26 changes the transmission channel to deliver the packet data processed by the terminal-side communication protocol terminating unit 21 to the network-side communication protocol terminating unit 22 and not to the prebuffer 25.

Figure 3:
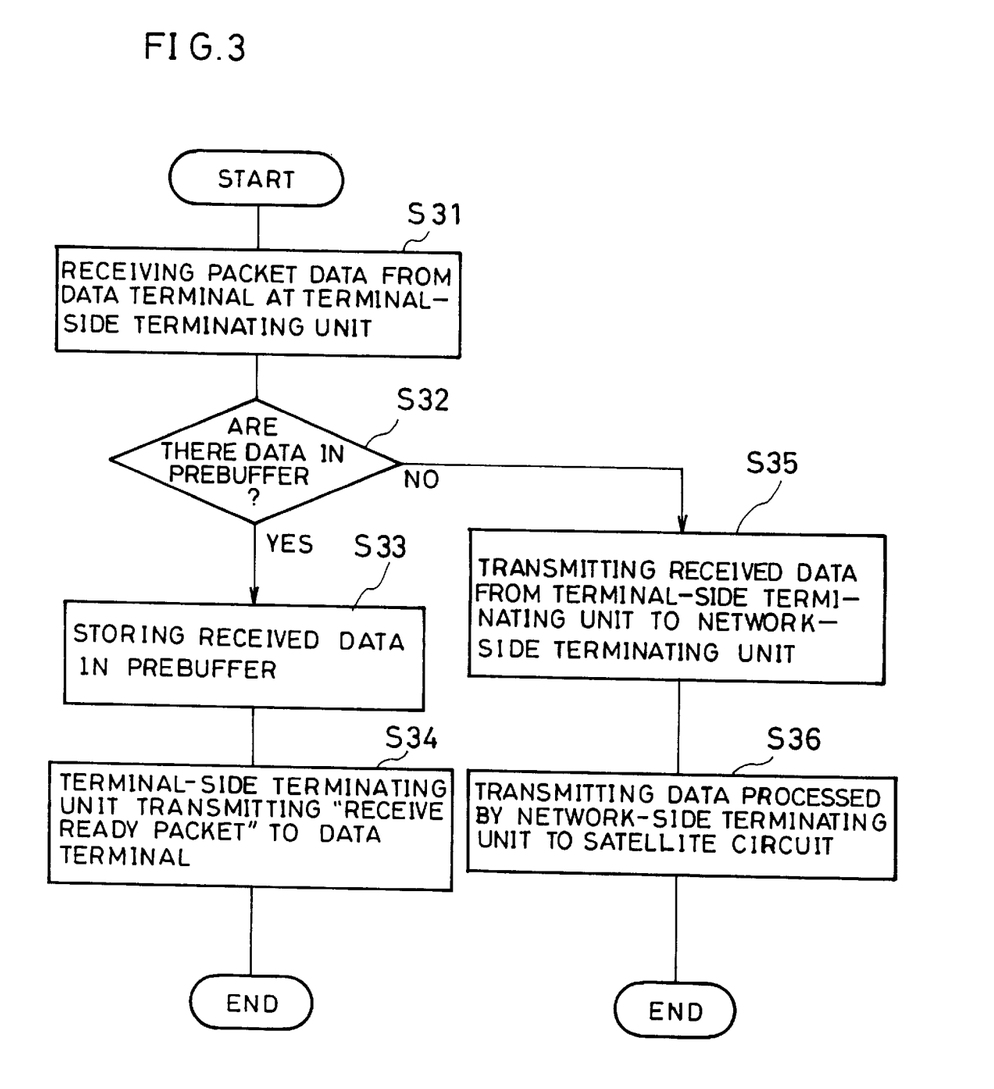
FIG. 3 is a flow chart for processing packet data.

FIG. 3 is a flow chart for processing packet data from the data terminal 1. Packet data from the data terminal 1 are first received by the terminal-side communication protocol terminating unit 21 (step S31). The switching unit 26 judges whether packet data are stored in the prebuffer 25 (step S32). When data are stored in the prebuffer 25, the received data are stored in the prebuffer 25 from the terminal-side communication protocol terminating unit 21 through the switching unit 26 (step S33). At this point, the terminal-side communication protocol terminating unit 21 transmits a receive ready packet to the data terminal 1 in accordance with a protocol. On the other hand, when data are not stored in the prebuffer 25, the transmission channel is changed by the switching unit 26, and the received data are transmitted to the network-side communication protocol terminating unit 22 from the terminal-side communication protocol terminating unit 21 through the switching unit 26 (step S35), processed by the network-side communication protocol terminating unit 22 and transmitted to the satellite circuit (step S36).

Judgment on whether the radio communication channel is in a fault state or not based on the reception level is carried out as follows. The reported reception level is stored each time it is received, and it is judged that a fault occurs when the reported reception level falls below a preset reference reception level an "n" number of times continuously while it is judged that the circuit is recovered when the reported reception level exceeds the above reference reception level an "m" number of times continuously. The value of the above reference reception level and the numbers "n" and "m" are suitably set according to the mobile terminal system or the like.

In this Embodiment 1, the judging unit 24 of the mobile satellite packet terminal 2 judges whether the radio communication channel is in a fault state or not based on the reception level of the radio communication channel from the satellite 2 measured by the satellite circuit monitoring unit 23. When it is judged that the radio communication channel is in the fault state, packet data transmitted from the data terminal 1 are stored in the prebuffer 25 without being transmitted to the satellite circuit. When it is judged that the radio communication channel is recovered from the fault state, the data stored in the prebuffer 25 are transmitted sequentially. Therefore, satellite communication can be carried out with certainty without missing packet data to be transmitted. Further, since the transmission of the next packet data is urged by giving a receive ready signal to the data terminal 1 from the mobile satellite packet terminal 2 when a fault in the radio communication channel occurs, the transmission of the packet data to the mobile satellite packet terminal 2 from the data terminal 1 can be carried out smoothly.

Embodiment 2

In the above Embodiment 1, it is judged whether the radio communication channel is in a fault state or not based on the reception level of the radio communication channel from the satellite 3 measured by the satellite circuit monitoring unit 23. In Embodiment 2 of the present invention, the satellite circuit monitoring unit 23 calculates the reception level and the change rate of the reception level and informs the judging unit 24 of these. The judging unit 24 judges that the possibility that the radio communication channel will fall into a fault state is large when the change rate meets a predetermined condition (fault prediction judgment), stores packet data processed by the terminal-side communication protocol terminating unit 21 in the prebuffer 25 and gives a receive ready signal to the data terminal 1 from the mobile satellite packet terminal 2 to urge the transmission of the next packet data, thereby making it possible to prevent missing packet data to be transmitted and transmit packet data to the mobile satellite packet terminal 2 from the data terminal 2 smoothly. Recovery from a fault state is judged based on the reception level as in the above Embodiment 1, and when the radio communication channel is recovered from the fault state, the data stored in the prebuffer are transmitted sequentially.

The above predetermined condition is suitably set according to a mobile terminal system or the like. For example, the condition is that the change rate of reception level is calculated by dividing a difference between the reception level of a p-th time and the reception level of a (p+1)-th time by the reference reception level and the absolute value of the negative change rate is larger than a predetermined value, or that the change rate is continued to be negative a predetermined number of times.

Further, recovery from a fault state may be judged based on both of the reception level and the change rate of reception level. For example, it may be judged that the radio communication channel is recovered from a fault state when the reported reception level exceeds a predetermined reference reception level an "m" number of times continuously and the absolute value of the positive change rate of reception level exceeds a predetermined value. In this case, judgment on recovery becomes more accurate and missing packet data to be transmitted can be prevented without fail.

Embodiment 3

In the above Embodiment 1, it is judged whether the radio communication channel is in a fault state or not based on the reception level of the radio communication channel from the satellite 3 measured by the satellite circuit monitoring unit 23. It may be judged whether the radio communication channel is in a fault state or not based on the synchronism of the reception state of the radio communication channel detected by the satellite circuit monitoring unit 23. That is, in Embodiment 3 of the present invention, the judging unit 24 judges whether a UW (unique word: synchronism word) added to a reception signal can be detected by the satellite circuit monitoring unit 23 and judges that the radio communication channel is in a fault state when the UW cannot be detected.

Alternatively, the satellite circuit monitoring unit 23 detects the above synchronism a predetermined number of times, calculates the frequency of reception asynchronism and informs the judging 24 of the frequency. The judging unit 24 may judge that the radio communication channel is in a fault state when the above frequency exceeds a predetermined value.

Embodiment 4

In the above Embodiment 1, it is judged whether the radio communication channel is in a fault state or not based on the reception level of the radio communication channel from the satellite 3 measured by the satellite circuit monitoring unit 23. It may be judged whether the radio communication channel is in a fault state or not based on the C/N ratio of the radio communication channel measured by the satellite circuit monitoring unit 23. That is, in Embodiment 4 of the present invention, the satellite circuit monitoring unit 23 counts how often the phase of a detected reception signal shifts from a preset phase within a predetermined time duration, calculates the C/N ratio of the reception signal from the counted value and informs the judging unit 24 of the calculated C/N ratio. The judging unit 24 judges that the radio communication channel is in a fault state when the C/N ratio falls below a predetermined value.

In the above Embodiment 4, the change rate of the C/N ratio of the reception signal is calculated, it is judged that the possibility that the radio communication channel is in a fault state is large when the absolute value of the negative change rate exceeds a predetermined value, and packet data processed by the terminal-side communication protocol terminating unit 21 are stored in the prebuffer 25, thereby making it possible to prevent missing packet data to be transmitted without fail.

In the above Embodiments 1, 3 and 4, it is judged whether the radio communication channel is in a fault state or not by detecting the reception level, the synchronism of the reception signal and the C/N ratio, respectively. When judgment on whether the radio communication channel is in a fault state is carried out by combining two or all of the above detection values, judgment accuracy can be further improved.

Further, it may be judged whether the radio communication channel is in a fault state or whether it is recovered from the fault state by combining arbitrarily the detected reception level, the detected synchronism of the reception signal, the detected C/N ratio, the detected change rate of the reception level, the detected change rate of the frequency of the synchronism of the reception signal and the detected change rate of the C/N ratio.

While satellite communication between mobile stations has been described in each of the above Embodiments, the present invention can be applied to communication between a fixed station and a mobile station or between fixed stations.

As described above, the method for transmitting packet data from a satellite packet terminal according to the first aspect of the present invention comprises the steps of judging whether a radio communication channel is in a fault state or not based on the reception state of a reception signal received from a satellite through the radio communication channel, storing packet data to be transmitted to the satellite in storage means when it is judged that the radio communication channel is in a fault state, and transmitting the packet data stored in the storage means to the satellite sequentially when it is judged that the radio communication channel is recovered from the fault state. Therefore, there are no missing packet data to be transmitted and satellite communication can be effected without fail.

The method for transmitting packet data from a satellite packet terminal according to the second aspect of the present invention comprises the steps of judging whether a radio communication channel will fall into a fault state based on the change rate of the reception state of a reception signal received from a satellite through the radio communication channel, storing packet data to be transmitted to the satellite in storage means when it is judged that the radio communication channel will fall into a fault state, and transmitting the packet data stored in the storage means to the satellite sequentially when it is judged that the radio communication channel is recovered from the fault state. Therefore, missing packet data to be transmitted can be prevented without fail.

The satellite packet terminal according to the third aspect of the present invention comprises a satellite circuit monitoring unit for measuring the reception level of a reception signal received from a satellite through a radio communication channel, a judging unit for judging whether the radio communication channel is in a fault state or not based on the measured reception level, and a prebuffer for storing packet data transmitted from a data terminal, wherein the packet data transmitted from the data terminal are stored in the prebuffer when it is judged that the radio communication channel is in a fault state to secure the packet data to be transmitted to the satellite and transmitted from the prebuffer to the satellite sequentially when it is judged that the radio communication channel is recovered from the fault state. Therefore, all the packet data can be transmitted to the satellite without an omission.

The satellite packet terminal according to the fourth aspect of the present invention calculates the change rate of the reception level of a reception signal, judges whether the radio communication channel will fall into a fault state based on the calculated change rate of the reception level, stores packet data transmitted from the data terminal in the prebuffer when it judges that the radio communication channel will fall into a fault state, and transmits the packet data stored in the prebuffer to the satellite sequentially when it judges that the radio communication channel is recovered from the fault state. Therefore, missing packet data to be transmitted can be prevented without fail.

The satellite packet terminal according to the fifth aspect of the present invention comprises a satellite circuit monitoring unit for detecting whether a reception signal received from a satellite through a radio communication channel is synchronized or not, a judging unit for judging whether the radio communication channel is in a fault state or not based on the synchronism of the reception signal, and a prebuffer for storing packet data transmitted from a data terminal, wherein the packet data transmitted from the data terminal are stored in the prebuffer when it is judged that the radio communication channel is in a fault state to secure the packet data to be transmitted to the satellite and transmitted from the prebuffer to the satellite sequentially when it is judged that the radio communication channel is recovered from the fault state. Therefore, all the packet data can be transmitted without an omission.

The satellite packet terminal according to the sixth aspect of the present invention calculates the frequency of the asynchronism of a reception signal, judges whether the radio communication channel will fall into a fault state based on the frequency of the asynchronism of the reception signal, stores packet data transmitted from the data terminal in the prebuffer when it judges that the radio communication channel will fall into a fault state, and transmits the packet data stored in the prebuffer to the satellite sequentially when it judges that the radio communication channel is recovered from the fault state. Therefore, missing packet data to be transmitted can be prevented without fail.

The satellite packet terminal according to the seventh aspect of the present invention comprises a satellite circuit monitoring unit for measuring the C/N ratio of a reception signal received from a satellite through a radio communication channel, judging unit for judging whether the radio communication channel is in a fault state or not based on the measured C/N ratio, and a prebuffer for storing packet data transmitted from a data terminal housed in the satellite packet terminal, wherein the packet data transmitted from the data terminal are stored in the prebuffer when it is judged that the radio communication channel is in a fault state and transmitted from the prebuffer to the satellite sequentially when it is judged that the radio communication channel is recovered from the fault state. Therefore, all the packet data can be transmitted without an omission.

The satellite packet terminal according to the eighth aspect of the present invention calculates the change rate of the C/N ratio of a reception signal, judges whether the radio communication channel will fall into a fault state based on the change rate of the C/N ratio, stores packet data transmitted from the data terminal in the prebuffer when it judges that the radio communication channel will fall into a fault state and transmits the packet data stored in the prebuffer to the satellite sequentially when it judges that the radio communication channel is recovered from the fault state. Therefore, missing packet data to be transmitted can be prevented without fail.

What is claimed is:

1. A method for transmitting packet data from a satellite packet terminal comprising the steps of:

judging whether a radio communication channel is in a fault state or not based on the reception state of a reception signal received from a satellite through the radio communication channel;

storing packet data to be transmitted to the satellite in a storage buffer when it is judged that the radio communication channel is in a fault state; and transmitting the packet data stored in the storage buffer to the satellite sequentially when it is judged that the radio communication channel is recovered from the fault state.

2. A method for transmitting packet data from a satellite packet terminal comprising the steps of:

judging whether a radio communication channel will fall into a fault state based on a rate of change of a reception state of a reception signal received from a satellite through the radio communication channel;

storing packet data to be transmitted to the satellite in a storage buffer when it is judged that the radio communication channel will fall into a fault state; and transmitting the packet data stored in the storage buffer to the satellite sequentially when it is judged that the radio communication channel is recovered from the fault state.

3. A satellite packet terminal for transmitting packet data transmitted from a data terminal housed in the satellite packet terminal to a packet data network through a satellite, the satellite packet terminal comprising:

a satellite circuit monitoring unit for measuring the reception level of a reception signal received from the satellite through a radio communication channel;

a judging unit for judging whether the radio communication channel is in a fault state or not based on the measured reception level; and a prebuffer for storing the packet data transmitted from the data terminal, wherein the packet data transmitted from the data terminal are stored in the prebuffer when it is judged that the radio communication channel is in a fault state and transmitted from the prebuffer to the satellite sequentially when it is judged that the radio communication channel is recovered from the fault state.

4. The satellite packet terminal of claim 3, wherein the satellite circuit monitoring unit calculates the change rate of the reception level of the reception signal, the judging unit judges whether the radio communication channel will fall into a fault state based on the change rate of the reception level, and the packet data transmitted from the data terminal are stored in the prebuffer when it is judged that the radio communication channel will fall into a fault state.

5. A satellite packet terminal for transmitting packet data transmitted from a data terminal housed in the satellite packet terminal to a packet data network through a satellite, the satellite packet terminal comprising:

a satellite circuit monitoring unit for detecting whether a reception signal received from the satellite through a radio communication channel is synchronized or not;

a judging unit for judging whether the radio communication channel is in a fault state or not based on the synchronism of the reception signal; and a prebuffer for storing the packet data transmitted from the data terminal, wherein the packet data transmitted from the data terminal are stored in the prebuffer when it is judged that the radio communication channel is in a fault state and transmitted from the prebuffer to the satellite sequentially when it is judged that the radio communication channel is recovered from the fault state.

6. The satellite packet terminal of claim 5, wherein the satellite circuit monitoring unit calculates the frequency of the asynchronism of the reception signal, the judging unit judges whether the radio communication channel will fall into a fault state based on the frequency of the asynchronism of the reception signal, and the packet data transmitted from the data terminal are stored in the prebuffer when it is judged that the radio communication channel will fall into a fault state.

7. A satellite packet terminal for transmitting packet data transmitted from a data terminal housed in the satellite packet terminal to a packet data network through a satellite, the satellite packet terminal comprising:

a satellite circuit monitoring unit for measuring the C/N ratio of a reception signal received from the satellite through a radio communication channel;

a judging unit for judging whether the radio communication channel is in a fault state or not based on the measured C/N ratio; and a prebuffer for storing the packet data transmitted from the data terminal, wherein the packet data transmitted from the data terminal are stored in the prebuffer when it is judged that the radio communication channel is in a fault state and transmitted from the prebuffer to the satellite sequentially when it is judged that the radio communication channel is recovered from the fault state.

8. The satellite packet terminal of claim 7, wherein the satellite circuit monitoring unit calculates the change rate of the C/N ratio of the reception signal, the judging unit judges whether the radio communication channel will fall into a fault state based on the change rate of the C/N ratio, and the packet data transmitted from the data terminal are stored in the prebuffer when it is judged that the radio communication channel will fall into a fault state.

\* \* \* \* \*